June 5, 1956
A. DESJARLAIS
2,749,079
VALVE
Filed April 26, 1954
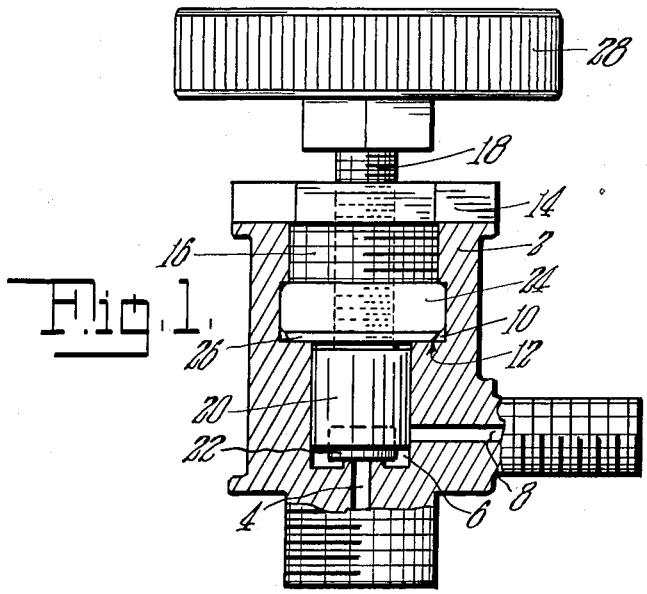
INVENTOR.
Arthur Desjarlais
BY
Rossi Ross
Atty & Agent

United States Patent Office 2,749,079
Patented June 5, 1956

2,749,079
VALVE

Arthur Desjarlais, Springfield, Mass., assignor of one-half to Frederick E. Desjarlais, Agawam, Mass.

Application April 26, 1954, Serial No. 425,635

1 Claim. (Cl. 251—214)

This invention relates to a valve construction and is directed more particularly to a shut-off valve.

The principal object of the invention is the provision in a shut-off valve of means between the inlet and outlet for shutting off the flow of fluid or gas therethrough in combination with spindle sealing means to prevent the flow of fluid or gas therepast in either the open or closed position of the valve.

To the above cited and other ends and with the foregoing various other novel features and advantages and other objects of my invention as will become more readily apparent as the description proceeds, my invention consists in certain novel features of construction and in the combination and arrangement of parts as will be hereinafter more particularly pointed out in the claim hereunto annexed and more fully described and referred to in connection with the accompanying drawings wherein:

Fig. 1 is a sectional elevational view through a valve embodying the novel features of the invention; and Fig. 2 is an inverted plan view of the valve shown in Fig. 1.

Referring now to the drawings more in detail, the invention will be fully described.

A body is represented by 2 which has an inlet 4 leading into an elongated bore 6 and an outlet 8 extending therefrom for connecting to a source of pressure and to apparatus with which the valve is to be used.

A chamber 10 is provided above the bore 6 which is of greater diameter than the bore to provide a shoulder 12 around the bore. A cap 14 has a threaded portion 16 threadedly engaging the upper portion of the chamber 10, as shown.

An elongated stem 18 is provided with screw threads, of relatively fine pitch as shown, which threadedly engage the cap. A piston 20 on the lower end of the stem slides up and down in the bore 6 accordingly as the stem is turned in one direction or the other so as to open or close the valve.

A relatively rigid disc 22 is provided on the lower end of the piston 20 for engaging a seat around the inlet in the closed position thereof, as shown.

A packing ring 24 is provided which snugly fits the screw threads of the stem 18 and a washer 26 is disposed around the stem below said ring. The ring will preferably be formed from resilient material such as rubber, rubber composition or the like so as to be radially expansible when subjected to endwise pressure. A handle 28 is carried by the stem 18 for turning the same between open and closed positions of the parts.

The valve is shown in the drawings in its closed position. In closing the valve, the stem is turned in one direction to bring the disc 22 onto the seat around the inlet 4. The stem and packing ring are so associated that as the stem is turned in closing direction, the ring is expanded against the walls of the chamber to prevent leakage upwardly between the ring and chamber and between the ring and stem, should there be a slight leak past the disc. That is, the washer 26 engages shoulder 12 and the stem tends to compress the ring so as to expand it radially in the chamber.

In opening the valve, the stem is turned in an opposite direction so as to lift the disc from off the seat of inlet 4. As the piston moves upwardly, the piston 20 acts on washer 26 which compresses the ring 24 against the bottom of the cap so as to expand it radially against the walls of chamber 10.

As the disc 22 is moved onto the inlet seat in closed position of the parts, or as said disc is moved upwardly to open position, the packing ring is expanded in the chamber with the ring snugly embracing the stem whereby upward leaks are prevented.

The valve is constructed and arranged for closing off pressures of considerable magnitude without danger of leaks at any time.

The invention may be embodied in other specific forms without departing from the essential characteristics thereof. Hence, the present embodiments are therefore to be considered in all respects merely as being illustrative and not as being restrictive, the scope of the invention being indicated by the appended claim rather than by the foregoing description, and all modifications and variations as fall within the meaning and purview and range of equivalency of the appended claim are therefore intended to be embraced therein.

What it is desired to claim and secure by Letters Patent of the United States is:

A valve construction comprising, a body having an axially aligned and interconnected inlet and lower bore and upper chamber, an outlet extending transversely outwardly from the lower side of the lower bore, the upper chamber being relatively larger in diameter than the lower bore and providing an annular shoulder in the upper chamber around the upper end of the lower bore, an inlet seat in the lower end of the lower bore around the inlet, a cap having a downwardly depending portion in threaded engagement with the upper chamber, a unitary compressible packing ring in the upper chamber between the shoulder and lower end of the downwardly depending portion of said cap and engaging the wall of the upper chamber, a stem extending downwardly through said cap and packing ring, a piston fixed to the lower end of said stem below said packing ring and being rotatable and slidable relative to the wall of the lower bore, a washer loosely held on said stem, in the upper chamber between said packing ring and piston, a closure disc on the lower end of said piston for seating on the inlet seat in the lower bore and closing said inlet, and said stem being threaded in said cap and tightly threaded in said packing ring, all adapted and arranged whereby, on rotation of said stem in one direction for closing said valve, said stem compresses said ring against the wall of the upper chamber and against said washer to urge said washer onto the shoulder, said piston is moved over the outlet and said closure disc is engaged with the inlet seat, and, on rotation of said stem in an opposite direction for opening said valve, said piston uncovers the outlet, said closure disc is moved from the inlet seat and said washer is engaged by said piston to compress said ring against the wall of the upper chamber and the lower end of said cap.

References Cited in the file of this patent
UNITED STATES PATENTS

| 233,670 | Goetzinger | Oct. 26, 1880 |
| 1,324,196 | Kellum | Dec. 9, 1919 |
| 1,495,403 | Davis | May 27, 1924 |
| 2,646,245 | Bedini | July 21, 1953 |

FOREIGN PATENTS

| 3,516 | Italy | of 1872 |
| 6,795 | Great Britain | 1913 |
| 17,608 | France | of 1856 |
| 685,355 | Great Britain | 1952 |